United States Patent
Draft

(10) Patent No.: US 7,261,059 B2
(45) Date of Patent: *Aug. 28, 2007

(54) CAGE FOR TRANSPORTING AND STUNNING LIVESTOCK

(76) Inventor: Roger Draft, 5500 East 68th, Newaygo, MI (US) 49337

( * ) Notice: Subject to any disclaimer, the term of this patent is extended or adjusted under 35 U.S.C. 154(b) by 415 days.

This patent is subject to a terminal disclaimer.

(21) Appl. No.: 10/785,636

(22) Filed: Feb. 24, 2004

(65) Prior Publication Data

US 2004/0194721 A1    Oct. 7, 2004

Related U.S. Application Data

(63) Continuation of application No. 10/092,657, filed on Mar. 7, 2002, now Pat. No. 6,694,918.

(51) Int. Cl.
*A01K 31/07* (2006.01)

(52) U.S. Cl. .................. 119/453; 119/481; 119/400

(58) Field of Classification Search ............... 119/481, 119/494, 501, 524, 453, 496, 497, 843, 452, 119/455, 400, 412, 415
See application file for complete search history.

(56) References Cited

U.S. PATENT DOCUMENTS

| | | | | | |
|---|---|---|---|---|---|
| 1,580,775 | A | * | 4/1926 | Barker | 119/481 |
| 2,220,436 | A | * | 11/1940 | Ziegler | 410/135 |
| 4,285,299 | A | * | 8/1981 | Thomas | 119/453 |
| 4,365,590 | A | * | 12/1982 | Ruggieri et al. | 119/418 |

* cited by examiner

*Primary Examiner*—Kimberly S. Smith
(74) *Attorney, Agent, or Firm*—Price Heneveld Cooper Dewitt & Litton LLP

(57) ABSTRACT

A cage is provided for holding and transporting livestock. The cage includes a door with a horizontal top rod that slides along a top member of a side grate when opening and closing the door. The cage also includes four lifting lugs to assist in the moving of the cages. Also provided is a method of loading livestock into such a cage.

14 Claims, 5 Drawing Sheets

CAGE FOR TRANSPORTING AND STUNNING LIVESTOCK

CROSS-REFERENCE TO RELATED APPLICATIONS

The present application is a continuation of U.S. patent application Ser. No. 10/092,657, filed Mar. 7, 2002, now issued U.S. Pat. No. 6,694,918, the entire content of which is hereby incorporated herein by reference.

BACKGROUND OF THE INVENTION

This invention relates to the butchering of livestock, and more particularly to the transporting, stunning, and slaughtering of livestock.

Generally, livestock, for example poultry, is raised at one location and butchered at another. Most of the current and traditional means for transporting and stunning poultry involve much manual physical labor. Some have attempted to reduce the labor involved, and others have attempted to reduce the expense of transporting livestock, but they have failed to achieve both objectives. Current transportation and handling of livestock is inefficient and labor intensive. In addition, traditional methods of handling and transporting live animals have led to bruising of the meat of the animals. This is undesirable as the appearance and quality of the meat is very important to the consumer purchasing it. Thus, there is a need for an inexpensive automated system for transporting livestock from where the livestock is raised to where it is butchered. There is also a need for an apparatus that can be used in such an automated system that is inexpensive to manufacture and easy to use.

SUMMARY OF THE INVENTION

The present invention is a cage for holding and transporting livestock and includes a cage frame that provides the general structure and shape of the cage. The cage frame defines an opening at one end of the cage and a cavity near its bottom. A door is included and sized to generally fit in the opening. The door has a bottom portion and a top horizontal rod, and is adapted to prevent livestock from exiting the opening when in a closed position. The cage also includes a member attached to the frame along which the top horizontal rod rides when the door is opened. The cavity in the cage frame is adapted to receive the bottom portion of the door when the door is in the closed position so that the door will not open unintentionally.

Another aspect of the present invention is a cage for holding and transporting livestock including a frame that provides the general structure and shape of the cage and defines an opening at one end of the cage. It also includes at least one door adjacent the opening with the door having a bottom. A cradle is attached to the frame and is adapted to receive the bottom of the door to hold the door open when the bottom of the door nests in the cradle.

Yet another aspect of the present invention is a method of loading livestock into a cage, comprising the steps of: (a) providing a cage including a frame having a front and a lower cavity, a door adjacent the front of the cage in an initial position, the door having top horizontal rod at the top of the door, the door also having a bottom and a cradle attached to the frame, the door being in an initial position with the bottom of the door in the lower cavity; (b) opening the door by motivating the top of the door rearwardly sufficient to pull the bottom of the door out of the lower cavity; (c) placing the bottom of the door in the cradle to hold the door in the open position; (d) loading livestock into the cage; and (e) returning the door to its initial position.

These and other features, advantages, and objects of the present invention will be further understood and appreciated by those skilled in the art by reference to the following specification, claims, and appended drawings.

DETAILED DESCRIPTION OF PREFERRED EMBODIMENT

Figure 3:
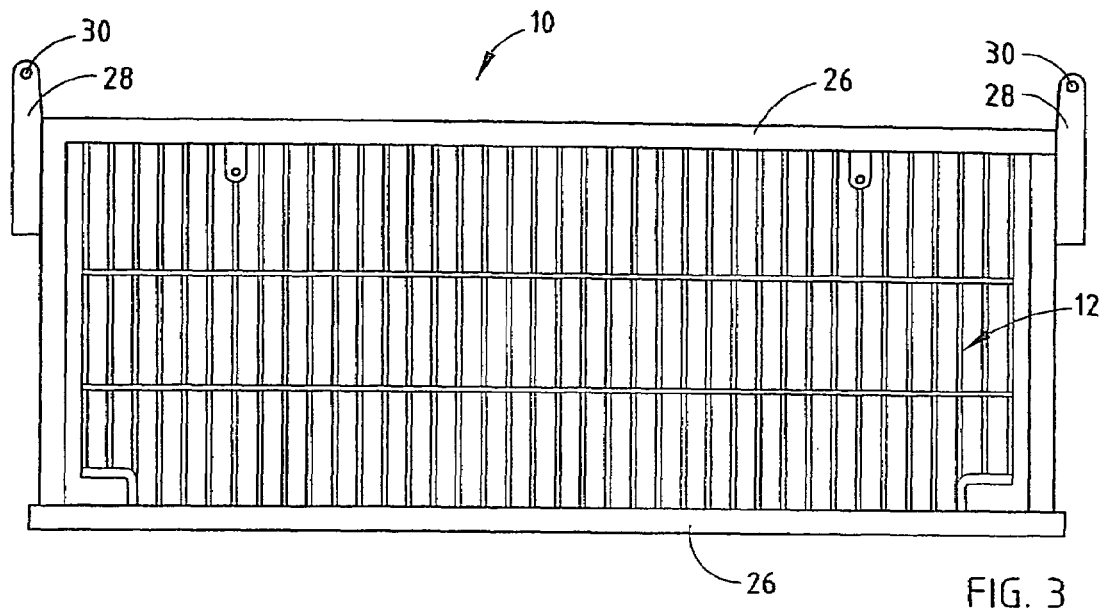
FIG. 3 is a front elevational view of the cage of FIG. 1.

For purposes of description herein, the terms "upper," "lower," "right," "left," "rear," "front," "vertical," "horizontal," and derivatives thereof shall relate to the invention as oriented in FIG. 3, the front of the cage facing out from the printed page. However, it is to be understood that the invention may assume various alternative orientations, except where expressly specified to the contrary. It is also to be understood that the specific devices and processes illustrated in the attached drawings, and described in the following description, are simply exemplary embodiments of the inventive concepts defined in the appended claims. Hence, specific dimensions or other physical characteristics relating to the embodiments disclosed herein are not to be considered as limiting, unless the claims expressly state otherwise.

Figure 1:
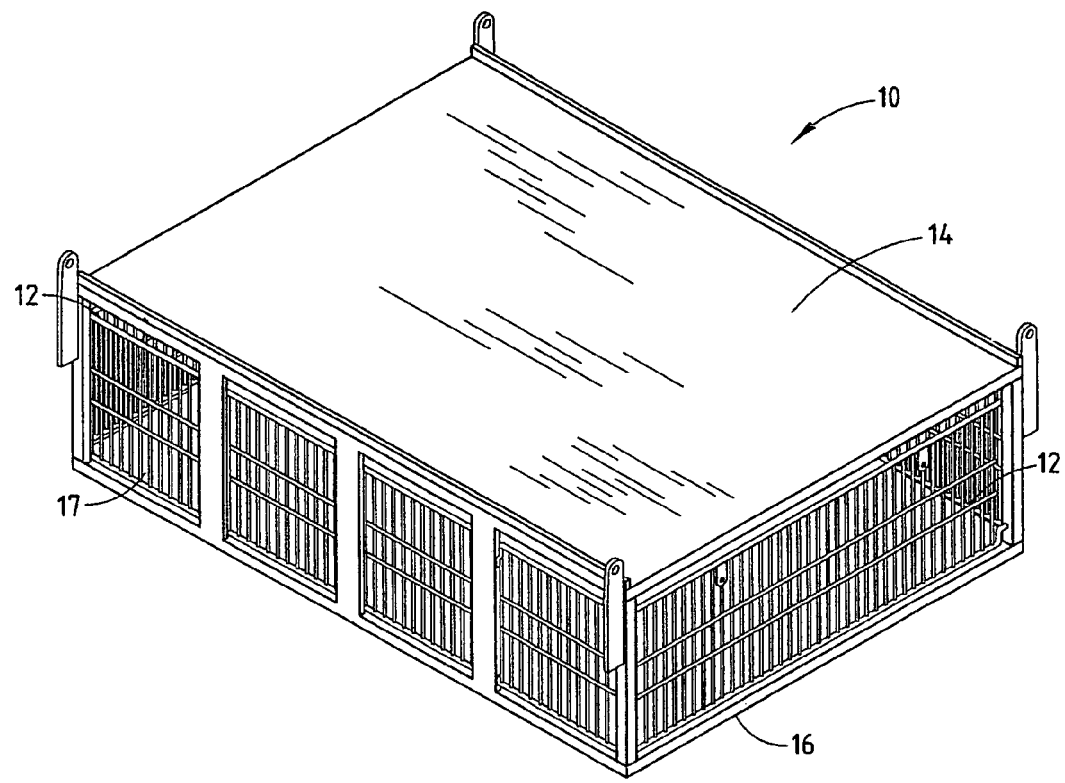
FIG. 1 is a perspective view of the cage for transporting livestock of the present invention.
Figure 2A:
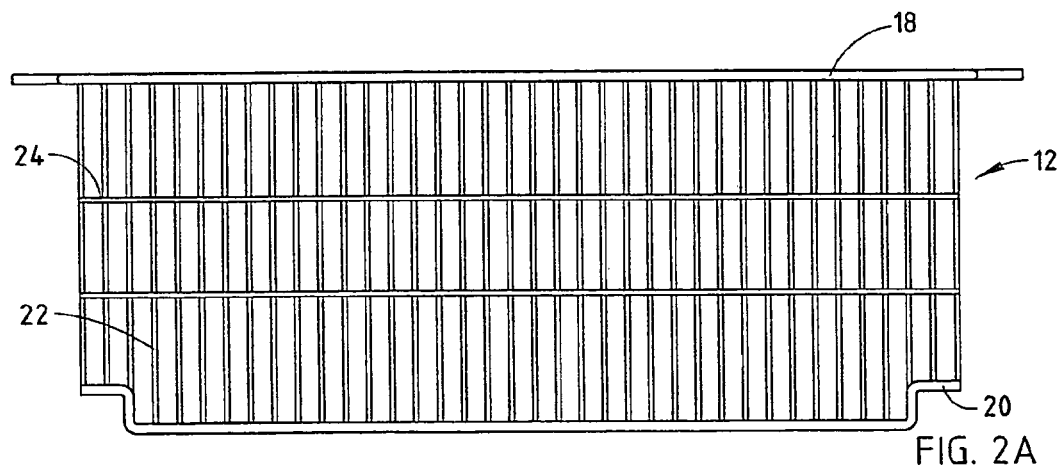
FIG. 2A is a front elevational view of the door of the cage of FIG. 1.
Figure 2B:
FIG. 2B is a top plan view of the top horizontal bar of the door.

As shown in FIG. 1, cage 10 includes two doors 12 made of metal wire mesh, one at each end of cage 10. Cage 10 further includes a solid top 14, a solid bottom 16, and a floor 17 resting on bottom 16. Door 12 (FIG. 2) includes a top horizontal rod 18, a bottom rod 20, and a plurality of vertical wire rods 22 that are attached, preferably welded, to both horizontal top rod 18 and bottom rod 20 to form door 12. For support, two horizontal wire rods 24, which are the same or approximately the same diameter and cross section as vertical wire rods 22, are attached across vertical wire rods 22, preferably by welding. Bottom rod 20 is bent upward and then again to horizontal to form an "S"-like configuration at each of its ends for ease of maneuverability and use. FIG. 2B shows a top view of top horizontal rod 18. At each end, top horizontal rod 18 has a bend that is generally perpendicular to its longitudinal axis, and another bend back to parallel with its longitudinal axis to form an "S"-like configuration at its ends similar to those of bottom rod 20. As shown in FIG. 2A, the end portions of top horizontal rod 18 extend horizontally beyond the remainder of door 12.

Figure 4:
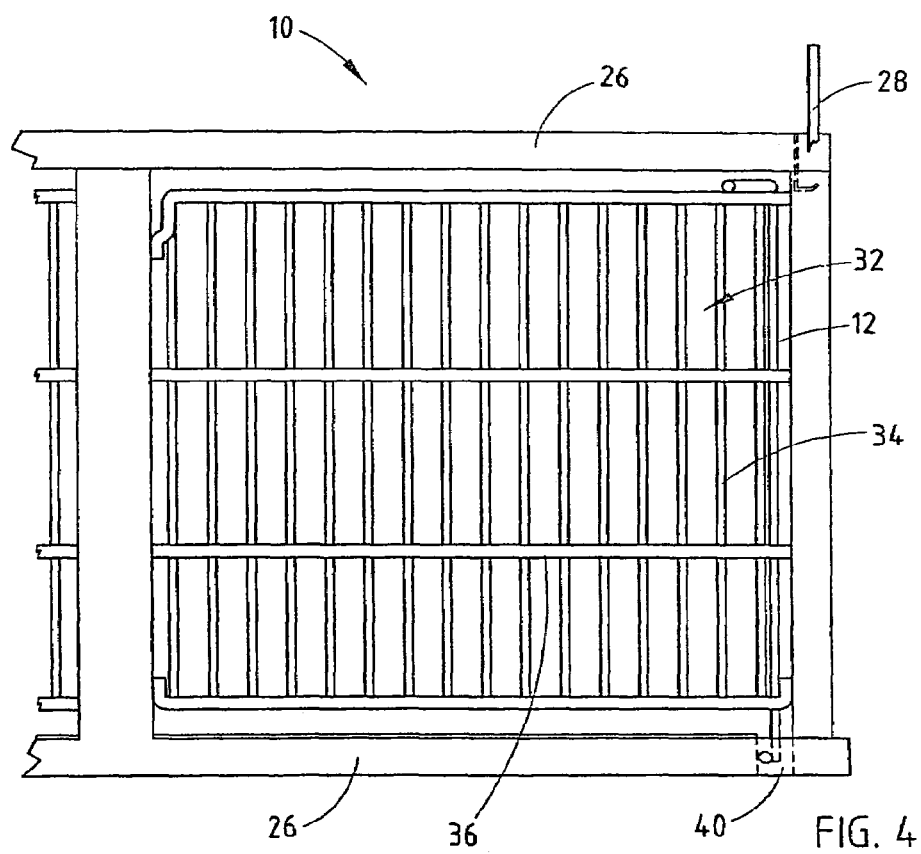
FIG. 4 is a partial side elevational view of the cage of FIG. 1 with the door in the closed position.

FIG. 3 shows the front of cage 10, including a frame 26 and door 12. Frame 26 provides the general shape and size of the cage and is made of a rigid and durable material such as steel. Cage 10 also includes four lifting lugs 28, two near each end, for use in lifting the cage off of a stack of cages or off a tractor-trailer bed. One lifting lug 28, having a hole 30 therein is attached to the frame 26 near each corner of cage 10. FIG. 4 is a partial view of the cage from the side, showing most of the components thereof. Attached to frame 26 is a wire mesh grate 32 that generally encloses one section of one side of cage 10. Wire mesh grate 32 includes a plurality of vertical rods 34, horizontal rods 36, and a top member 38. The end of top horizontal rod 18 of the door 12 rests on top member 38. Frame 26 has a cut-out portion near its bottom that defines a channel 40. The bottom of doors 12, including bottom rod 20, rests inside channel 40 when door 12 is in the closed position, as in FIG. 4.

Figure 5:
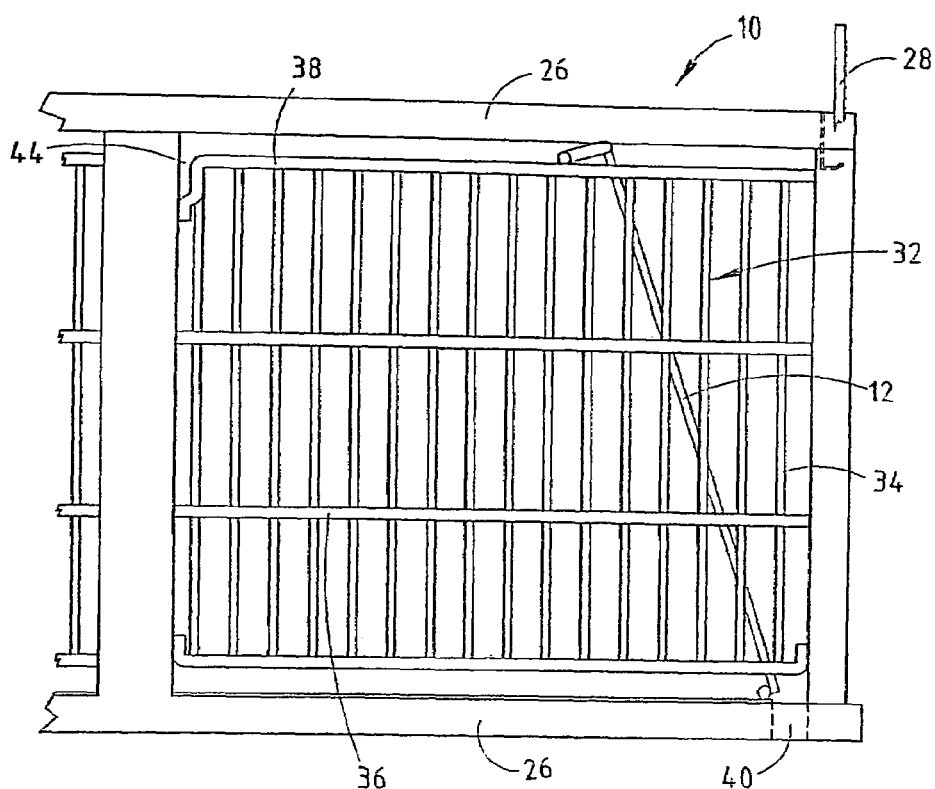
FIG. 5 is a partial side elevational view of the cage of FIG. 1 with the door partially opened.
Figure 6:
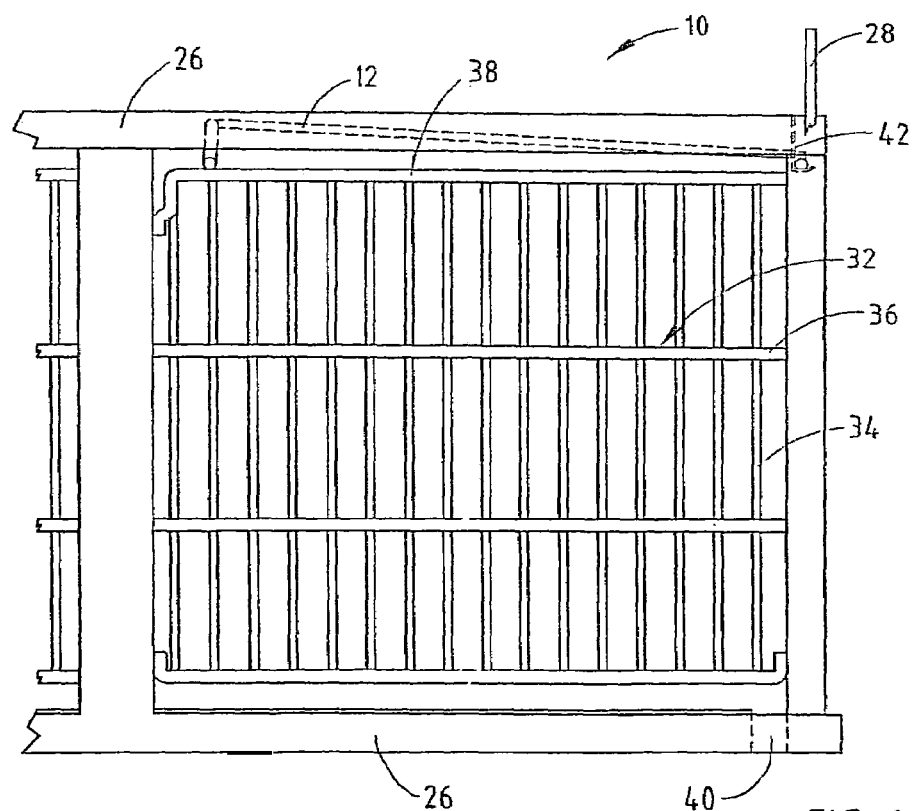
FIG. 6 is a partial side elevational view of the cage of FIG. 1 with the door retracted.

In operation, when loading livestock into cage 10, the top of door 12 is forced rearwardly, either manually (such as by hand) or by an automated system that can apply the requisite force to push the top rearwardly. Top horizontal rod 18 of door 12 rides along top member 38 on both sides of cage 10 and when moved rearwardly, the bottom of door 12 is pulled out of channel 40, as shown in FIG. 5. The next step of the operation for loading is to pull the bottom of door 12 upwardly and push the top of door 12 rearwardly along the top member 38. When the top of door 12 is pushed back far enough, the bottom rod 20 of door 12 can be placed in one or more cradles 42 attached to frame 18 (see FIG. 6). Placing bottom rod in cradle 42 holds the door in the open position so that the livestock can then be loaded into cage 10 by whatever means desired. After the livestock is loaded, bottom rod 20 is pulled out of cradles 42 and the door is closed, reversing the steps above for opening the door 12. The bottom of door 12 is put in channel 40 and the cage is now ready to be transported.

Figure 7:
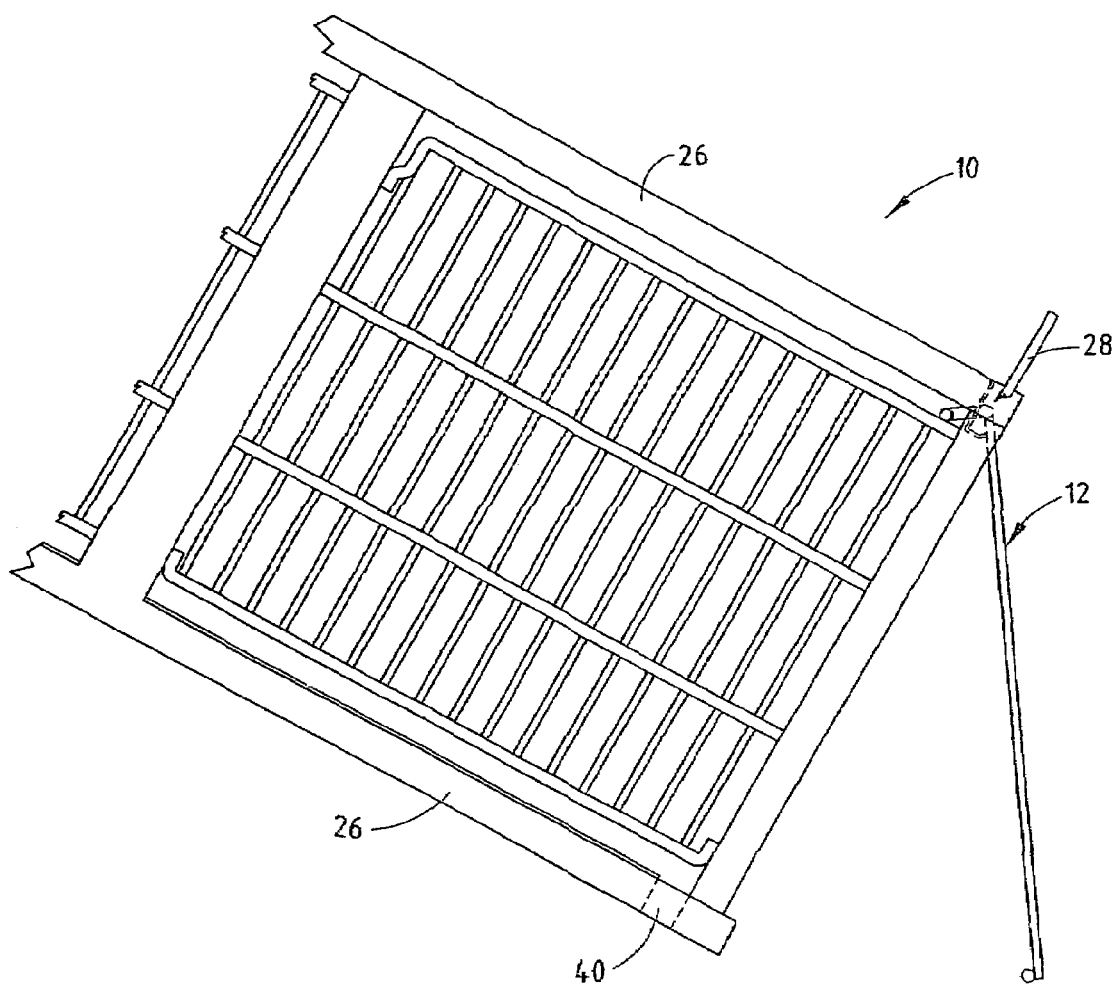
FIG. 7 is a partial side elevational view of the cage of FIG. 1 at an angle with the door opened.

Once the desired location is reached, to unload the livestock, door 12 is again opened to the position shown in FIG. 5. The cage can then be tilted, as shown in FIG. 7, whereupon door 12 will swing open away from the front of cage 10 allowing the livestock to exit cage 10 due to gravity.

Another feature of cage 10 is the bend in top member 38 leaving a gap 44, as shown in FIG. 5. The bend in top member 38 is such that the gap 44 is sized so that the top horizontal rod 18 of door 12 can fit therein and when maintenance is needed on door 12, the entire door can be pulled out through the side of cage 10.

Figure 8:
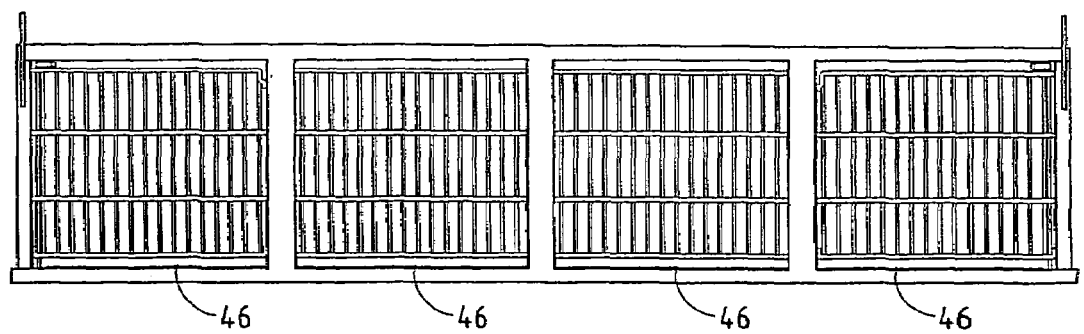
FIG. 8 is a side elevational view of the cage of FIG. 1.
Figure 9A:
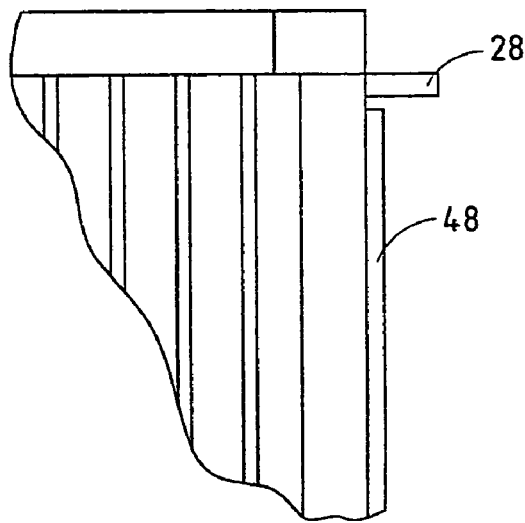
FIG. 9A is a cut-away top plan view of a corner of the cage of FIG. 1.
Figure 9B:
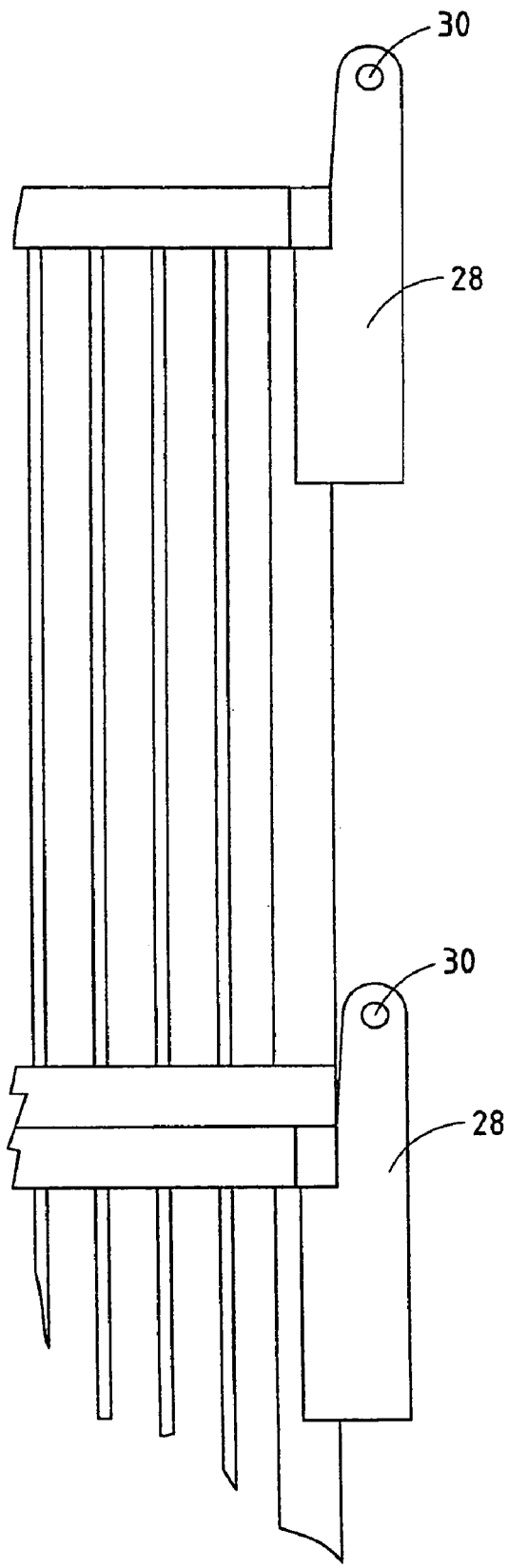
FIG. 9B is a cut-away side elevational view showing the stacking arrangement of two cages of the present invention.

FIG. 8 shows a side view of the entire cage of the present invention. An opening 46 is left between each wire mesh grate 32 and floor 17, so that the cage can be easily cleaned, such as with a hose, after the livestock is unloaded, to remove feces, feathers, and other debris. FIGS. 9A and 9B show the general size and spatial relationship of lifting lugs 28 on cage 10. Lifting lugs 28 are sized so that when two cages are stacked as shown in FIG. 9B, there is a vertical space between them, thereby allowing automatic destacking if such means are available. Cage 10 also includes two lips 48, one on either side. Lip 48 prevents the cages 10 from sliding off of one another when stacked. The cage of the present invention is designed so that at least five cages can be stacked from top to bottom and transported on a tractor-trailer bed from one location to another.

The above description is considered that of the preferred embodiments only. Modifications of the invention will occur to those skilled in the art and to those who make or use the invention. Therefore, it is understood that the embodiments shown above are merely for illustrative purposes and not intended to limit the scope of the invention, which is defined by the following claims as interpreted according to the principles of patent law, including the doctrine of equivalents.

The invention claimed is:

1. A cage for holding and transporting livestock comprising:
    a frame that provides the general structure and shape of the cage, the frame defining at least one opening at one end of the cage and a cavity near the bottom of the cage;
    at least one door sized to generally fit in the at least one opening, having a bottom portion and a top horizontal rod and adapted to prevent livestock from exiting the at least one opening when the door is in a closed position;
    a member attached to the frame along which the top horizontal rod of the at least one door rides when the at least one door is opened; and
    the cavity in the frame being adapted to receive the bottom portion of the at least one door when the door is in the closed position so that the at least one door will not open unintentionally.

2. The cage defined in claim 1 wherein the top horizontal rod of the at least one door has a shaft portion with a longitudinal axis, and a first end having a longitudinal axis that is different from the longitudinal axis of the shaft portion.

3. The cage defined in claim 2 and further comprising at least one lifting lug with a hole therein.

4. The cage defined in claim 3 wherein the cage comprises four lifting lugs.

5. The cage defined in 4 wherein the four lifting lugs are each sized so that when the cages are stacked, there is a vertical gap between the lifting lugs of a first cage and the lifting lugs of a second cage directly above or below the first cage.

6. The cage defined in claim 1 and further comprising at least one cradle attached to the frame near the top of the at least one opening and adapted to receive the bottom of the at least one door.

7. The cage defined in claim 1 wherein the cage includes a grate with an upper member that is shaped such that the at least one door can be removed from the cage.

8. A cage for holding and transporting livestock, comprising:
    a frame that provides the general structure and shape of the cage, the frame defining at least one opening at one end of the cage;
    at least one door adjacent the at least one opening and having a bottom; and
    at least one cradle attached to the frame and adapted to receive the bottom of the at least one door to hold the door open when the bottom of the at least one door rests in the at least one cradle.

9. The cage defined in claim 8 and further including a side grate with a top member and wherein the at least one door includes a horizontal top rod, a portion of which is engaged with the top member.

10. The cage defined in claim 9 wherein the at least one cradle is two cradles.

11. The cage defined in claim 10 and further including a cavity in the bottom of the frame adapted to receive the bottom of the door when the door is in the closed position.

12. The cage defined in claim 8 wherein the at least one cradle is two cradles.

13. The cage defined in claim 8 and further including a cavity in the bottom of the frame adapted to receive the bottom of the door when the door is in the closed position.

14. A cage for holding and transporting livestock comprising:
- a frame that provides a general structure and shape of the cage, the frame defining at least one opening at one end of the cage and a cavity near the bottom of the cage;
- at least one door sized to generally fit in the at least one opening, having a bottom portion in a top bar and adapted to prevent livestock from exiting the at least one opening when the door is in a closed position;
- at least one cradle attached to the frame near the top of the at least one opening and adapted to receive the bottom of the at least one door;
- an elongated member attached to the frame along which the top bar of the at least one door slides when the at least one door is opened;
- a grate with an upper member that is shaped such that the at least one door can be removed from the cage; and
- the cavity and the frame being adapted to receive the bottom portion of the at least one door when the door is in closed position so that the at least one door will not open unintentionally.

* * * * *